Patented Sept. 21, 1948

2,449,581

UNITED STATES PATENT OFFICE 2,449,581

QUANTITATIVE DETERMINATION OF UNSATURATED ALDEHYDES

Joseph E. Bludworth, Max O. Robeson, and Harry A. Truby, Jr., Corpus Christi, Tex., assignors to Celanese Corporation of America, a corporation of Delaware No Drawing. Application March 27, 1945, Serial No. 585,208

4 Claims. (Cl. 23—230)

This invention relates to a novel analytical procedure and relates more particularly to an improved method for the quantitative determination of acrolein, or other unsaturated aliphatic aldehyde, by volumetric analytical procedures.

An object of this invention is the provision of a rapid and accurate method for the quantitative determination of acrolein or other unsaturated aliphatic aldehyde, in various solutions by volumetric methods of analysis.

Another object of this invention is to provide a method for determining the concentration of acrolein in the various fractions obtained when the reaction mixture resulting on vapor phase oxidation of aliphatic hydrocarbons is subjected to fractional distillation operations, extraction, and the like.

Other objects of this invention will appear from the following detailed description.

The unsaturated aldehyde, acrolein, is produced in varying quantities during the vapor phase oxidation of aliphatic hydrocarbons such as butane, propane, etc. This unsaturated aldehyde may be separated from the reaction mixture employing various techniques including distillation, extraction and the like. Since this aldehyde is a valuable intermediate in the synthesis of numerous organic compounds, the separation should be as efficient and complete as possible. A rapid and accurate quantitative determination of the acrolein concentration in any residual solution or fraction obtained during its separation procedures and in which saturated aldehydes would not interfere, would be highly advantageous since it would provide an excellent check on the efficiency of the separation procedures employed.

We have now found that the acrolein concentration in any given solution may be determined quantitatively in a rapid and accurate manner by placing the acrolein in solution in carbon tetrachloride and then titrating said solution with a carbon tetrachloride solution of bromine in the presence of antimony trichloride as catalyst. The acrolein solution is titrated directly, employing a standardized bromine solution, the addition of the bromine solution being continued until the absorption ceases and the yellow color of bromine persists for about 15 seconds. The persistence of the bromine color indicates that absorption has ceased and that the end point has been reached. By suitable stoichiometric calculation, a quantitative determination of the acrolein concentration may then be obtained. Our novel method is quite accurate and the presence of saturated aldehyde does not interfere with the accuracy of the determination.

The solution of acrolein in carbon tetrachloride which is titrated, in accordance with our novel process, may be obtained by distilling the acrolein from the aqueous solutions in which it is usually present and then dissolving the distillate in carbon tetrachloride. Any propionaldehyde distilling over with the acrolein may be disregarded since it is not affected by the bromine added thereto. As stated, such aqueous solution of acrolein is obtained following the removal of the major portion of the acrolein therefrom by prior extraction or distillation operations.

While we preferably employ antimony trichloride, other double bond addition catalysts, such as other antimony trihalides are suitable. The catalyst is effective over a wide range of proportions and may be employed in amounts of from $\frac{1}{10}$ to 100 parts by weight based on the acrolein present in the carbon tetrachloride solution to which the bromine addition is made. The bromine solution may be of any concentration but a standard solution of approximately 1 N is preferred.

The titration is most advantageously effected at about room temperature, i. e. about 20° C. but higher or lower temperatures are also satisfactory.

In order further to illustrate our invention but without being limited thereto the following example is given:

Example

There is produced during the vapor phase oxidation of butane, a mixture of acrolein and propionaldehyde which cannot readily be separated by distillation. In order to determine the amount of acrolein present in the mixture, a sample weighing 0.3463 gm. is added to 50 cc. of carbon tetrachloride containing 0.1 gm. of antimony trichloride. The solution obtained is then titrated with a standard solution of bromine in carbon tetrachloride of 1.142 N. The end point is reached when the yellow color of bromine persists for 15 seconds. 5.8 cc. of bromine solution are required to reach the end point. On suitable calculation, the titration indicates that a concentration of 53.5% acrolein is present in the initial solution. On checking the titration against a solution prepared with reagent acrolein and propionaldehyde, the analysis is found to be accurate within a few percent.

It is to be understood that the foregoing detailed description is given merely by way of illustration and that many variations may be made therein without departing from the spirit of our invention.

Having described our invention, what we desire to secure by Letters Patent is:

1. Process for the quantitative determination of unsaturated aliphatic aldehydes, which comprises titrating a solution of said unsaturated aliphatic aldehyde in an inert organic solvent containing a double bond addition catalyst with a standardized solution of bromine dissolved in said inert organic solvent until the reaction of bromine with the aldehyde ceases, as indicated by the persistence of the yellow color of bromine in the solution for an appreciable length of time.

2. Process for the quantitative determination of acrolein, which comprises titrating a solution of acrolein in an inert organic solvent containing a double bond addition catalyst with a standardized solution of bromine dissolved in said inert organic solvent until the reaction of bromine with the acrolein ceases, as indicated by the persistence of the yellow color of bromine in the solution for an appreciable length of time.

3. Process for the quantitative determination of acrolein, which comprises titrating a solution of acrolein in carbon tetrachloride containing antimony trichloride with a standardized solution of bromine in carbon tetrachloride until the reaction of bromine with the acrolein ceases, as indicated by the persistence of the yellow color of bromine in the solution for an appreciable length of time.

4. Process for the quantitative determination of acrolein, which comprises titrating a solution of acrolein in carbon tetrachloride containing $\frac{1}{16}$ to 100 parts by weight of antimony trichloride on the weight of the acrolein being titrated with a standardized solution of bromine in carbon tetrachloride until the reaction of bromine with the acrolein ceases, as indicated by the persistence of the yellow color of bromine in the solution for an appreciable length of time.

JOSEPH E. BLUDWORTH.
MAX O. ROBESON
HARRY A. TRUBY, Jr.

REFERENCES CITED

The following references are of record in the file of this patent:

Shriner and Fuson, "Identification of Organic Compounds," 2nd ed., 1940, pages 36 and 37.

Groggins, "Unit Processes in Organic Synthesis," 2nd ed., 1938, pages 200, 201 and 206.

Fieser and Fieser, "Organic Chemistry," 1944, page 60.